UNITED STATES PATENT OFFICE.

H. W. BEINS, OF NEW YORK, N. Y.

TREATMENT OF VULCANIZED RUBBER.

Specification of Letters Patent No. 23,151, dated March 8, 1859.

*To all whom it may concern:*

Be it known that I, HENRY WILLIAM BEINS, of the city and State of New York, have invented a new and improved mode of repairing india-rubber car-springs and other articles such as have been in the first process insufficiently vulcanized and other pieces the outsides of which have through age or wear become rigid or otherwise impaired.

The nature of my invention consists in covering the surface of the article to be reheated with a layer of unvulcanized india rubber composition, by which it is secured against the injurious action experienced in exposing the same surface more than once to the vulcanizing process.

It is well known that the qualities of india rubber are greatly impaired if they are heated a second time; they undergo a decomposition on the surface and the parts near to it. To prevent such result, it is desirable to coat the article with a coat of new india rubber composition; but this could not be effected as it has been formerly considered impossible to unite vulcanized with not-vulcanized india rubber.

To give a full and thorough explanation of the process invented by me, I will proceed to describe its application, as follows:

The two samples sent herewith are prepared after the mode invented by me. The materials are the same in both samples, and both have been prepared in precisely the same manner. On the samples, A is the old india rubber; B is the coat or covering of new india rubber. In the samples the new rubber (B) is vulcanized.

If an india rubber article, for instance a car spring, should for any reason require reheating, I clean and dry its surface carefully, and coat it with a cement made by dissolving unvulcanized india rubber car spring composition in camphine to the consistency of thick oil paint. This cement being useful only for the purpose of facilitating the work of covering the old material (A, on the samples) with the coat or covering of new india rubber spring composition (B, on the samples). The cement having been perfectly dried to deprive it of its camphine, I wind around the spring sheets of the crude india rubber spring composition in the same manner as the spring cylinders generally are formed, taking care that no air is left between the sheet and the cement. If in this manner a coat of the desired thickness has been formed on the article, it is ready for heating to the degree required to vulcanize the outer coat or cover of new india rubber spring composition, (B, in the samples,) and at the same time thoroughly to unite it to the old material, (A, on the samples,) the union of the old and new rubber being perfect and enduring.

If a car spring, damaged by any cause, should need to be repaired, the decomposed or damaged parts should first be removed, and the sound part carefully cleaned and coated with the above described cement. After drying the same, sheets of unvulcanized rubber composition may be laid around it to the desired thickness; and the spring so repaired may be heated to the degree necessary to vulcanize the outer coat or cover of rubber composition (B, on samples) and to unite the whole in one perfect mass; and after such heating it will be just as good and durable a spring in every respect as a spring made entirely of new materials.

A whole spring or cylinder, equal in every respect to one made entirely from new materials, can be formed by cutting out of old springs or cylinders the good pieces and uniting them by coating the surfaces to be joined together with the cement above described, which is used solely for the purpose of keeping the pieces together and facilitating the further operations of preparing it for the outside coat or cover of new rubber composition; after in this manner a cylinder has been formed, its outside is to be coated with the cement and rubber sheets in the same way as described above; the spring so formed will after exposure to the degree of heat required to vulcanize the outer coat of india rubber composition (B, on the samples) and to thoroughly unite the whole be again a good article.

What I claim as my invention and desire to have secured by Letters Patent, is—

The process above described of cementing vulcanized india rubber to, and covering it with, a new layer of unvulcanized india rubber composition in the manner and for the purposes set forth.

HENRY WILLIAM BEINS.

Witnesses:
MAGNUS GROSS,
JUL. E. SIHWABE.